United States Patent

Anderson

[15] 3,647,232
[45] Mar. 7, 1972

[54] TOOLHOLDER
[72] Inventor: Dwayne Roy Anderson, Sylmar, Calif.
[73] Assignee: George D. Hayes, Sun Valley, Calif. a part interest
[22] Filed: Jan. 8, 1970
[21] Appl. No.: 1,508

[52] U.S. Cl. ............................................. 279/68, 408/240
[51] Int. Cl. ................................... B23b 29/08, B23b 31/04
[58] Field of Search .................... 77/18, 60; 29/57; 269/272; 279/68; 408/240

[56] References Cited

UNITED STATES PATENTS

| | | | |
|---|---|---|---|
| 627,480 | 6/1899 | Carleton | 279/68 |
| 3,298,091 | 1/1967 | Bowman | 77/60 |

FOREIGN PATENTS OR APPLICATIONS

| | | | |
|---|---|---|---|
| 545,451 | 7/1956 | Italy | 77/60 |

*Primary Examiner*—Francis S. Husar
*Attorney*—Victor Sepulveda

[57] ABSTRACT

A toolholder for retaining a cutting tool is disclosed for use in automatic screw machines, turret lathes, or the like. The toolholder includes a hollow tubular member adapted to be inserted into the turret of the machine tool. A baseplate is mounted to the tubular member and has an opening therein which communicates with the hollow portion of the tubular member. A first set of jaws is fixedly mounted to the baseplate and a second set of jaws is adjustably mounted to engage the first set of jaws. Each set of jaws includes a plurality of teeth which are adapted to interleave with opposing teeth.

2 Claims, 6 Drawing Figures

PATENTED MAR 7 1972  3,647,232
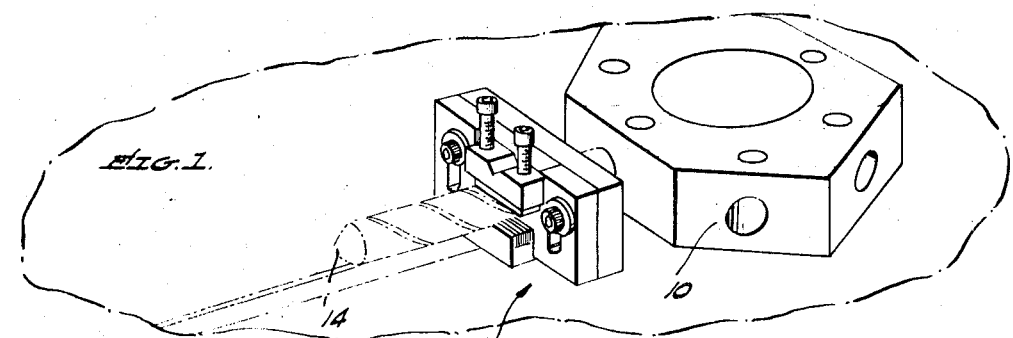
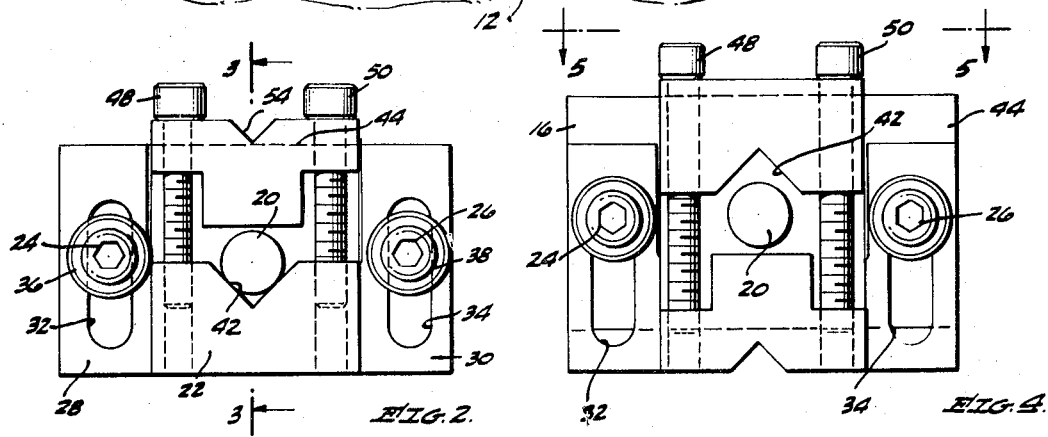
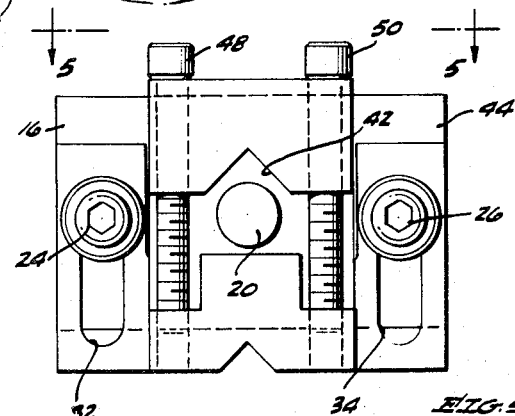
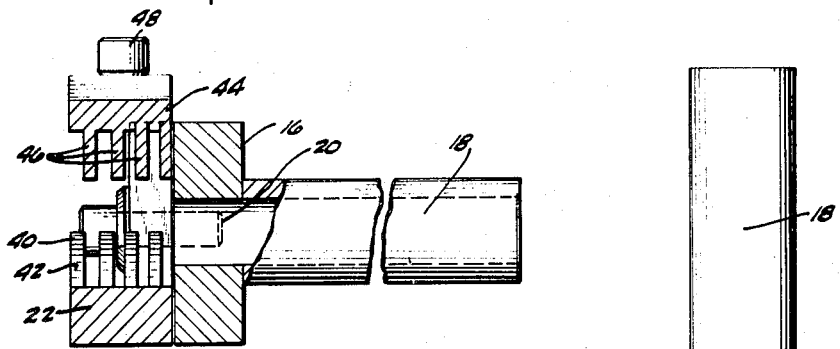
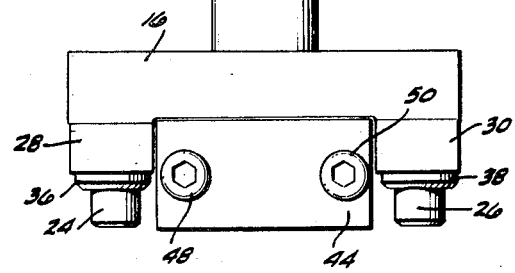
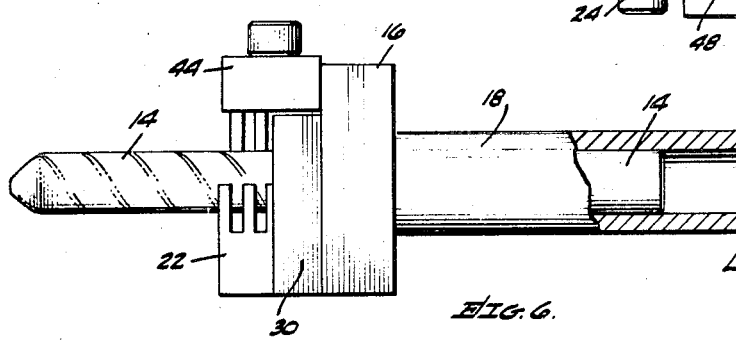
INVENTOR.
DWAYNE R. ANDERSON,
BY
Victor Sepulveda
ATTORNEY.

TOOLHOLDER

BACKGROUND OF THE INVENTION

A. Field of the Invention

This invention relates to toolholders and more particularly to a novel and improved toolholder which includes jaws having interleaving teeth which are adjustable to accommodate many sizes of cutting tools or the like.

B. Discussion of the Prior Art

Heretofore, machine tools such as automatic screw machines, turret lathes and other machines are capable of only holding a single size cutting tool. If a smaller size cutting tool, that is, the outside diameter thereof is small in size, is to be used, the operator would have to revert to a smaller size toolholder. If this replacement is required, the machine must be shut down, operation on the workpiece is secured until a new toolholder is installed. Sometimes in order to use the smaller cutting tool, the workpiece would have to be shifted to a smaller or larger machine whichever the case may be.

When the machine is shut down and not actually in use, an expense is created and hence loss of profits.

In the past, toolholders have been devised which are adaptable to the machine size by the shank of the toolholder being adapted to fit the turret. The toolholder is then capable of holding various size cutting tools regardless of the diameter of the tool.

A prior disadvantage of these prior art toolholders is that they are not always reliable in that it is difficult to manufacture a toolholder at a minimal expense which has the capabilities of firmly holding the tool. This disadvantage is increased in most cases by the fact that the toolholder must also be changed in order to accommodate various size tools.

Thus, it is desirous to provide a toolholder which has increased holding surfaces and yet is able to hold different size tools, for example, from size zero and up. Further, it is desirous to provide a toolholder which is quickly changed in the turret of the machine and thereby provides a minimal downtime because spare toolholders are available and can easily be put into the turret.

It should be noted that the toolholder is designed so as to replace worn tools to the exact position with a minimal amount of downtime.

BRIEF DESCRIPTION OF THE INVENTION

Briefly described a toolholder is described which includes a hollow tubular member which is adapted to be inserted into the turret of a machine tool. A baseplate is fixedly mounted perpendicular across one end of the tubular member and specifically the end which is adapted to extend from the turret. The baseplate has an opening therein which communicates with the hollow portion of the tubular member. A first set of jaws is disposed on the baseplate and is adjustably mounted thereto. The jaws include a plurality of spaced vertically teeth. A second set of jaws is positioned to engage the first set of jaws and also includes a plurality of spaced vertical teeth. Each set of teeth are adapted to be interleaved with one another at a junction juxtaposed to the opening in the baseplate.

A feature of the present invention includes, among other features, the fact that the spaced teeth which comprise the jaws provide an increased holding area or holding points on the tool when inserted between the teeth. The interleaving feature allows adjusting of the teeth into one another and can thereby accommodate different size tools and especially smaller sizes.

In one embodiment of this invention one of the jaws includes a V-shaped notch cut across the teeth thereof to further increase the number of holding points on a tool. For example, if one set of jaws has four vertically disposed holding teeth extending therefrom and the second set of jaws including four vertically disposed holding teeth includes the V-notch whereby the lower portion of the V of the second set of jaws is at the furthest distance from the first set of jaws, then the total number of contact points on the tool inserted therebetween is 12.

A device constructed in accordance with this invention is simple to manufacture and thereby the cost in acquiring such a tool by machine tool owners is comparably low. Thus, the operator is capable of owning a number of this type of toolholders. This provides an advantage by the fact that if a tool change is to be made, the operator is aware of the fact that this change is about to occur. He can then ready his spare tool with toolholders which decreases the downtime of the machine and thereby increases production.

DESCRIPTION OF THE DRAWINGS

These and other features and advantages will become more apparent to those skilled in the art when taken into consideration with the following detailed description wherein like reference numerals indicate like and corresponding parts throughout the several views and wherein:

FIG. 1 is a perspective view partially showing a machine tool turret with a toolholder disposed therein in accordance with the principles of this invention;

FIG. 2 is an end view of the toolholder illustrating the jaw shapes and adjusting apparatus;

FIG. 3 is a partial section view taken along the lines 3—3 of FIG. 2;

FIG. 4 is an alternate embodiment of a toolholders in accordance with the principles of this invention;

FIG. 5 is a view taken along the lines 5—5 of FIG. 4; and

FIG. 6 is a view illustrating the present invention including a cutting tool disposed therein.

DESCRIPTION OF PREFERRED EMBODIMENTS

Turning now to FIG. 1, there is shown a turret 10 which is the type well known to those skilled in the art for use in automatic screw and turret lathe machines or the like. It should be understood though that the toolholder of this invention may be used on high-speed drilling and cutting machines as will be hereinafter set forth. A toolholder 12 constructed in accordance with one embodiment of this invention is inserted into the turret in a manner to be described and the turret 10 securely clamps the cutting toolholder 12 in place in a suitable manner. A cutting tool 14 is shown extending from the toolholder 12.

In FIG. 2 there is illustrated a front view of the toolholder of one embodiment of this invention which shows a correct tool and simply place the new toolholder into the turret of the machine in place of the old toolholder. This substantially rectangular baseplate is mounted securely to a tubular member 18. The tubular member 18 is substantially hollow and fits into the turret 10 in a suitable manner. The base plate 16 also has a bore or hole 20 drilled therethrough which communicates with the hollow portion of the tubular member 18. A first set of jaws 22 includes a pair of supporting arms 28 and 30 and is clamped to the baseplate 16 by the threaded bolts 24 and 26 which are threaded into the baseplate 16. The supporting arm 28 has an elongated slot 32 cut therethrough and the supporting arm 30 has an elongated slot 34 cut therethrough. The bolt 24 is fitted with a washer 36 and threaded into the baseplate 16 through the elongated slot 32. The bolt 26 is fitted with a washer 38 and threaded into the baseplate 16 through the elongated slot 34. By loosening the bolts 24 and 26 through the slots 32 and 34 through the extension area 28 and 30 the baseplate 16 can be adjusted in a vertical movement and thereby in turn adjusted the jaws 22. Such an adjustment will permit the centering of the tool 14 within the toolholder 12.

With reference now to FIG. 3 the lower jaw 22 comprises a plurality of vertically disposed holding teeth 40. In this embodiment there are four such teeth 40 and further by this embodiment the jaw 22 has an elongated V-slot 42 which is cut through each one of the teeth 40.

Another set of jaws 44 has a plurality of matching vertically disposed holding teeth 46 which are offset with respect to the teeth 40. A pair of threaded members such as the bolts 48 and 50 pass through protruding arms 47 and 49 of the jaws 44 and are threaded into the supporting arms 28 and 30 of the lower jaw 22. These bolts 48 and 50 facilitate the adjusting of the jaws 44 with relation to the jaws 22.

Teeth of jaws 40 and 44 are substantially square shaped and the teeth 46 thereof are adapted to interleave with the teeth 40 of jaw 42. In this embodiment there are four such members 46 extending downwardly towards the center opening 20 of the backplate 16.

To facilitate the operation of holding a tool 14 within the teeth 40 and 46 of the jaws 22 and 44, with the tool holder in place in the turret 10 and fastened, bolts 24 and 26 are loosened. Bolts 48 and 56 are loosened to receive cutting tool 14. The bolts 48 and 56 are tightened to securely hold the cutting tool 14. Now the tool 14 is raised to the center of the work piece in the spindle of the machine tool. When centered, the bolts 24 and 26 are tightened to secure tool holder 10 in alignment and ready for operation.

The feature now can be seen that there are exactly 12 holding teeth to hold the tool 14 in the embodiment herein described. Further, longer shanked tools can be used in this embodiment in that they are easily fitted into the tubular member 18.

FIG. 4 illustrates a further embodiment of this invention whereby the V-shaped notch 42 is now provided in the teeth in the upper jaw 44 rather than in the lower jaw 22 as previously described. Also, it can be noted that a V-notch 54 is provided in one side of the jaw 44 as shown in FIG. 2, so that in order to facilitate larger work tools, jaw 44 is then turned over and the V-shaped notch can be used to facilitate these larger tools.

While there has been shown but only preferred embodiments of this invention, it should be understood that many alternations and modifications may be made and still remain within the spirit and scope of this invention.

What is claimed is:

1. A toolholder including:
    a hollow tubular member;
    a baseplate being fixedly mounted to said tubular member and having an opening therein which communicates with the hollow portion of said tubular member;
    a first set of jaws being connected to said baseplate adjacent to the opening in said base plate, said first set of jaws being V-shaped and including a plurality of spaced teeth;
    a second set of jaws being positioned to engage said first set of jaws and being disposed adjacent to the opening in said baseplate;
    said second set of jaws including a plurality of spaced teeth, said teeth of said first set being capable of interleaving in an overlapping relationship with said teeth of said second set;
    first means interconnecting said first and second set of jaws for effecting movement of said jaws relative to each other; and
    the holding surface of said second set of jaws being substantially planar in configuration.

2. The toolholder as defined in claim 1 including a second means of effecting synchronous movement of said first and second set of jaws relative to said baseplate.

* * * * *